Sept. 18, 1934.  E. A. SPERRY, JR  1,974,220
DIRECTION INDICATOR
Filed Dec. 31, 1929
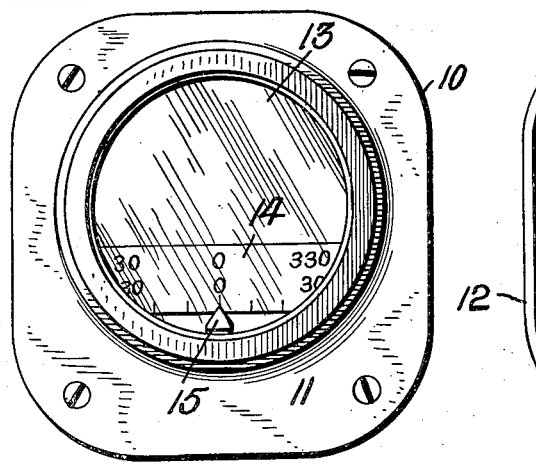
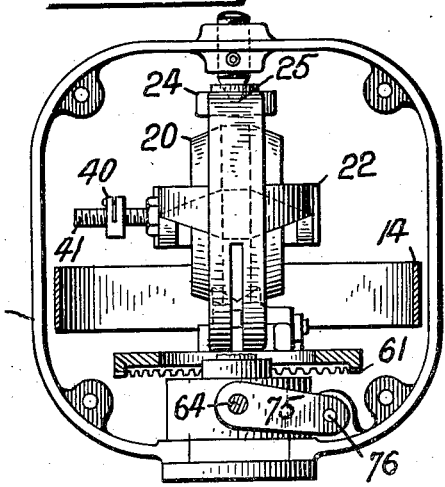
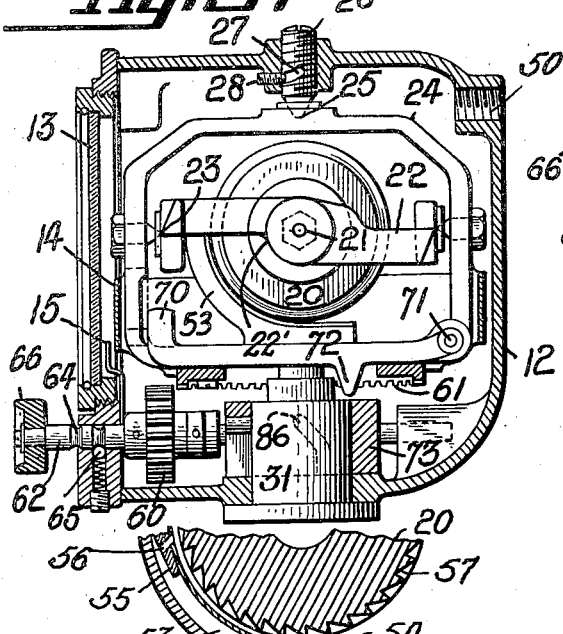
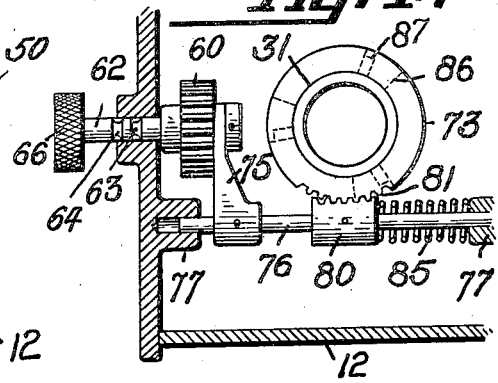
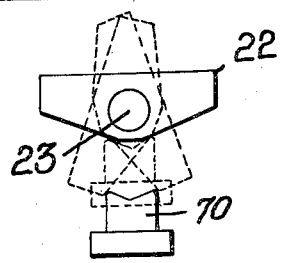
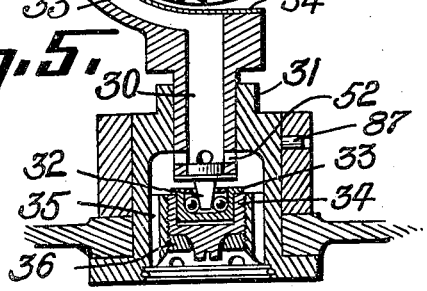
INVENTOR
ELMER A. SPERRY, JR.
BY
Herbert H. Thompson
his ATTORNEY Patented Sept. 18, 1934

1,974,220

UNITED STATES PATENT OFFICE 1,974,220

DIRECTION INDICATOR

Elmer A. Sperry, Jr., Brooklyn, N. Y., assignor to Sperry Gyroscope Company, Inc., Brooklyn, N. Y., a corporation of New York Application December 31, 1929, Serial No. 417,833

14 Claims. (Cl. 74—5)

This invention relates to course indicating devices for dirigible craft and is particularly adapted for use upon aircraft to indicate deviations from a predetermined straight course. The device may be used in ordinary flying to aid the pilot in maintaining a straight course, but it is particularly desirable when flying blind in fog or in clouds. The ordinary magnetic compass and the other types of compasses utilized in aircraft are subject to oscillations and lag and, therefore, are unreliable under such flying conditions as have been enumerated above. By this invention I provide a dead-beat directorscope which will maintain its fixed position in space for a considerable time and, if it is displaced at all, will wander from its set position only very slowly.

Heretofore directorscopes have been employed but the design has been such that only a small movement to either side of the course has been possible. This renders such a device deficient during such uses as when flying on a radio beam path where it is customary to fly past the transmitting station and reverse one's direction. This requires a turn of 180°, which was impossible with the types of directorscopes heretofore known. By my invention I provide a course indicating device which will be effective to indicate deviations in course throughout a full 360° of movement so that if a pilot wishes to turn back on his path he need only turn until his indicator discloses a 180° deviation from the set course, in which case he knows that he has reversed his path of travel.

It is a further object of my invention to provide a course indicating device which may be set at will with respect to the craft for any given number of degrees, and the craft may then be maneuvered to turn the vehicle through the set angle for a new course.

It is another object of my invention to provide means whereby the indicator may be fixed with respect to the airplane in any desired position of said indicator. Heretofore any such locking means was effective to centralize the indicator with respect to the aircraft and locking could not take place without such centralization.

It is a further object of my invention to improve the setting means for gyroscopes having three degrees of freedom, one of said degrees of freedom being about a horizontal axis and by a double acting or two-part means for locking said gyro to the airplane and resetting the same, one of said parts being effective around the one axis of freedom and another of said parts around another axis, whereby the gyroscope may be set in any predetermined position.

It is a further object of my invention to provide a director gyroscope as described above wherein although the gyro may tilt about its horizontal axis through substantially 90° in either direction, the caging or locking means acting about said horizontal axis will nevertheless be effective.

It is a further object of this invention to provide a two-part caging and locking means as described above with a single operating member for simultaneously operating both of said parts.

Other objects and advantages of this invention will become apparent in the following detailed description thereof.

In the accompanying drawing,

Fig. 1 is a front elevation of a course indicating instrument for a directorscope embodying my invention.

Fig. 2 is a view similar to Fig. 1 with the front cover removed.

Fig. 3 is a side vertical section through the Fig. 2 form of the invention.

Fig. 4 is a horizontal section through a portion of the Fig. 3 mechanism.

Fig. 5 is a vertical section through the gyro rotor and the air passages associated therewith.

Fig. 6 is a view, largely diagrammatic, showing the effectiveness of the caging mechanism about the horizontal axis of the gyro through substantially 90°.

Referring to Figs. 1 to 3 of the drawing, it will be seen that my instrument, indicated generally at 10, comprises a front cover 11 adapted to be set in the instrument board of an airplane and a casing 12 extending to the rear thereof, the cover being fastened to the casing in the usual manner. Through a glass window 13 in the front cover is visible a scale 14 having thereon two parallel scales of graduations ranging from zero to 360 degrees in either direction. The said scales cooperate with a pointer 15 to give an indication to the pilot of relative movements between the airplane to which the casing of the instrument is fixed and the fixed baseline maintained by gyro mechanism within the casing about to be described. As shown the pointer 15 is fixed to the casing while the scale 14 is carried by the gyro mechanism.

The gyro mechanism mounted within the casing 12 is designed to maintain a fixed baseline so as to maintain the scale 14 fixed, while the pointer 15 moves with the casing and the airplane in response to deviations of the airplane from a given course. The gyro mechanism comprises the gyro rotor 20 having a horizontal spinning axis 21 within a gimbal ring 22, said ring being mounted for movement about a horizontal axis 23 at right angles to axis 21 within a vertical ring 24. Said ring is mounted for oscillation about a vertical axis 25 by being pivoted about said axis within the casing 12. The upper pivot of frame 24 in said casing 12 may comprise a threaded member 26 having a cam slot 27 with which cooperates a screw 28 so that the ring 24 may be adjusted vertically within said casing. The lower pivot of vertical frame 24 may comprise a hollow trunnion 30 operating in a cylindrical bearing 31. In the lower end of trunnion 30 there is fixed a short journal 32 mounted in an anti-friction bearing in a cup 33 carried by a plug 34 threaded into the central portion of bearing 31. A series of air passages is drilled about this central portion, one of which appears at 35. The bearing 33 may be adjusted vertically to take up end play in the bearing by screwing plug 34 upwardly or downwardly in part 31 and locking the plug in adjusted position by a lock nut 36.

The gyroscope is thus mounted with three degrees of freedom and as such is subject to an apparent precession of about 10° to 15° an hour, depending upon the latitude, due to the earth's rotation. To compensate for this apparent precession there may be mounted on ring 22 a weight 40 adjustable upon a threaded stem 41 secured to the ring 22 in substantially the vertical plane of the axis 21. By properly adjusting weight 40 for a given latitude and other factors, there is induced a precessional force equal and opposite to that due to the earth's rotation so that the gyroscope would maintain a fixed and unvarying position with respect to the earth were it not for the presence of certain indeterminate factors which may cause a slow wander of the gyroscope through several degrees over a period of several hours.

For driving the gyroscope, the passage of the craft through the air may be utilized. For this purpose there may be provided in the casing an opening 50 which is connected to a means, such as a Venturi tube, on the outside of the aircraft for withdrawing air from the casing and other air is drawn in through the open end of bearing 31. The air passes through passages 35, thence through openings 52 in the lower end of trunnion 30 into the trunnion, and thence into a channel bar 53 adjacent the rotor and conforming to the curvature thereof. The bar is covered by a plate 54 so that the air is confined within the tube thus formed. The tube ends approximately with the horizontal plane of the rotor axis and is provided with a block 55 at its upper end having nozzles 56 therein for directing the air upwardly against the periphery of the rotor which is formed with a plurality of pockets 57 to drive the rotor. Gimbal 23 is offset as at 22' to permit a maximum tilt, before it strikes bar 53, of substantially 90°.

There has now been described one construction of an instrument which, because of the three degrees of freedom gyro, will maintain a fixed baseline to cause any deviation of the craft, with respect to this baseline, to be indicated by the relative displacement of the index 15 with respect to the scale 14. Thus, if the scale 15 registers with the zero indications on the scale 14, any deviation of the craft to the right or left will immediately be discovered by the pointer 15 indicating to the right or left of the said zero indications. Preferably I set the scale, by means to be hereinafter described, so that the desired course corresponds to the main compass indication. That is to say, 90° corresponds to east, 180° to south, 270° to west, and 360° or zero to north. I may, therefore, set the desired course in degrees corresponding to the cardinal course.

For the purpose of permitting the scale 14 to be set to correspond to the cardinal course as indicated by the main indication of a magnetic or other compass and also for the purpose of resetting the gyro when, after a period of time, a certain amount of wandering has taken place, I provide the following caging and setting mechanism. Heretofore it has been proposed to cage the gyro by providing a cone cooperating with an extension in line with the gyro spinning axis, the said cage being slidably mounted on the casing so that it would in every case restore the gyro to centralized position with respect to the casing and to the aircraft. This construction did not permit of more than a few degrees of relative movement between the gyro baseline and the casing. I provide a locking and caging mechanism which permits a full 360° of movement between the gyro baseline and the casing and which does not require that the gyro be restored in each instance to centralized position in azimuth with respect to the casing and the aircraft. The mechanism for accomplishing such locking around the vertical axis may comprise a locking gear 60 which is slidably mounted within the casing 12 so that it may be slid into and out of engagement with an annular gear 61 carried by the ring 24. When gear 60 is out of mesh with gear 61 there is no obstruction to the rotation of frame 24 and the gyro mounted therein throughout a full 360° of movement. In any position of the frame around the vertical axis, the gear 60 may be slid into engagement with gear 61 and thus locked against further movement around the vertical axis 25 by reason of the resistance of gear 60 and its operating shaft. Said shaft 62 may be provided with grooves 63—64 with which cooperates a spring pressed detent 65 to hold the gear 60 in its effective and ineffective positions, that is, in its locking and unlocking positions. The gear 60 may be operated by means of a knob 66 on the end of shaft 62 projecting forwardly from casing 12.

It will be apparent that by this construction not only is the gyro locked in position around the vertical axis in any position which it may happen to occupy in azimuth, but the position thereof with respect to the casing and the air craft may be changed by rotating knob 66 and overcoming the resistance to movement offered by the detent 65 in groove 64 and the frictional mounting of shaft 62 within the casing. This adjustment may serve to restore the gyro when it has wandered off its original setting, or it may be utilized for the purpose of setting a new course. Thus, for instance, if it is desired to fly on a course 30° clockwise removed from the preceding course, it is only necessary to set ring 24 and scale 14 thirty degrees in a counter-clockwise direction from its previous setting, and then bring the craft back to its original setting.

The above described mechanism is effective for locking the gyro about the vertical axis. Since wandering of the gyro is usually accompanied by the tilt of the gyro axis, it is desirable to cage the gyro about the horizontal axis at the same time that it is locked about the vertical axis. For this purpose I provide a caging member 70 having a forked end adapted to engage the frame 22 adjacent the axis 23 when said caging member 70 is swung up into contact with said ring 22. To swing the caging member 70 into engagement with ring 22, I may pivot said caging member on the vertical ring 24 at 71 and provide said member with a projection 72 which cooperates with a collar 73 vertically slidable on bearing 31 so as to engage said projection 72 and raise the caging member or permit the same to be lowered. Preferably I cause the raising and lowering of collar 73 to be effected at the same time and by the same mechanism, that is, by operation of handle 66 as is employed for locking the gyro about the vertical axis. For this purpose the shaft 62 may have attached at its inner end an arm 75 which is fixed at its other end on a shaft 76 slidably supported within bearings 77 in the casing. Said shaft 76 may carry a gear rack 80 which meshes with segmental rack 81 on the sleeve 73 to rotate the same when knob 66 and shaft 62 is pressed inwardly or is returned to its outward position. For causing the collar 73 to rise or fall as it is rotated in one direction or the other, I may provide within said collar 73 cam slots 86 in which engage pins 87 fixed to the bearing 31. The cam slots are so formed that inward movement of knob 66 and shaft 62 will cause upward movement of collar 73 to raise cage 70, while the return of said knob and shaft will cause the downward movement of collar 73 to free the gyro about its horizontal axis. As shown in Fig. 6 the caging mechanism will be effective in any displaced position of the gyro around its horizontal axis up to the maximum of substantially 90°.

Where it is not desired to employ detent 65 and groove 63, 64 the shaft 62 is held in its inward position by the operator and is returned to its outward position by a spring 85 (see Fig. 4).

It will thus be seen that in one and the same operation, pinion 60 is meshed with gear 61 to lock the gyro against movement around the vertical axis and the cage 70 is operated upwardly to cage the gyro around the horizontal axis 23. Similarly, in a single operation, the gear 60 is moved out of mesh with gear 61 and cage 70 is lowered.

In accordance with the provisions of the patent statutes, I have herein described the principle and operation of my invention, but I desire to have it understood that the apparatus shown is only illustrative and that the invention can be carried out by other means.

Having described my invention, what I claim and desire to secure by Letters Patent is:

1. In a gyroscopic indicator of direction, a casing, a gyro mounted therein with three degrees of freedom including relative movement about a vertical axis and for oscillation about a horizontal axis, means for continuously spinning the rotor thereof, and a combined locking and resetting means including means for centralizing said gyroscope about said horizontal axis substantially regardless of its inclination and regardless of its position about said vertical axis with respect to said casing, means for turning said gyro about said vertical axis while caged to change its relationship to said casing and a knob or thumb piece manually operable from without said casing for operating both of said last-named means.

2. In a gyroscopic indicator of direction, a casing, a gyro mounted therein with three degrees of freedom including relative movement about a vertical axis through a complete revolution and for oscillation about a horizontal axis, a rotatable setting member, a cage adapted to lock the gyro about said horizontal axis, actuating means for said cage brought into action upon axial movement of said member, and means whereby said gyro is set in any desired position in azimuth while caged by rotating said setting member.

3. In a device of the character described, a casing, a gyroscope mounted therein with three degrees of freedom for relative movement about a vertical axis through a complete revolution, a large gear carried by said gyroscope, a pinion normally out of engagement with said gear but operable axially into engagement therewith to lock said gyroscope to said casing, said pinion being rotatable to change the relationship of said gyroscope to said casing, cam means operable by said pinion upon axial movement thereof, and a lock operated thereby for caging said gyroscope about its horizontal axis.

4. In a directional gyroscope, a gyro rotor, a rotor bearing frame for mounting said rotor for spinning about a normally horizontal axis, a vertical ring in which said rotor bearing frame is journalled for oscillation about a second horizontal axis, an outer casing in which said vertical ring is journalled for turning about a vertical axis, a cage mounted on said vertical ring for resetting said rotor bearing ring about its horizontal axis into its normally horizontal position substantially regardless of its inclination and regardless of its position in azimuth, means for engaging said vertical ring to hold or turn the same at will, means for also simultaneously operating said cage upon the operation of said engaging means, and a device without said casing for operating both said last named means.

5. In a device of the character described, a casing, a gyro mounted therein with three degrees of freedom including freedom about horizontal and vertical axes, gearing for setting said gyro about the vertical axis to any desired position, means for caging said gyro about the horizontal axis, and a single knob for simultaneously operating said setting gearing and said caging means.

6. In a directional gyroscope, a fixed support, a vertical ring rotatably mounted about a vertical axis in said support, a gyroscope mounted in said ring for oscillation about a horizontal axis, a gear on said vertical ring, a slidably mounted gear adapted to be brought in mesh with said first mentioned gear to reset the gyroscope, means for sliding and rotating said gear, and means brought into action upon the sliding of said last mentioned gear toward said first mentioned gear for locking said gyroscope about its horizontal axis.

7. In a directional gyroscope, a fixed support, a vertical ring rotatably mounted about a vertical axis in said support, a gyroscopic rotor and rotor bearing frame mounted in said ring for oscillation about a horizontal axis, means on the vertical ring for engaging and centralizing said frame about said horizontal axis if inclined thereto, and a knob on said support for operating said centralizing means regardless of the position of the vertical ring.

8. In a directional gyroscope, a fixed support, a vertical ring rotatably mounted about a vertical axis in said support, a gyroscopic rotor and rotor bearing frame mounted in said ring for oscillation about a horizontal axis, means on the vertical ring for engaging and centralizing said frame about said horizontal axis, if inclined thereto, a knob on said support for operating said centralizing means regardless of the position of the vertical ring and frame, and means also operated from said knob for resetting said vertical ring.

9. In a direction indicating gyroscope for aircraft, a casing, a gyroscope mounted therein with three degrees of freedom including relative turning about a vertical axis and oscillation about a horizontal axis, means for caging said gyroscope while running about said horizontal axis, means for preventing precession about said vertical axis, said last-named means also being adapted to set said gyroscope while caged to any desired position about said vertical axis, and a common manually operable means for actuating both said other means.

10. In a directional gyroscope, a fixed support, a vertical ring rotatably mounted about a vertical axis in said support, a gyroscope mounted in said ring for oscillation about a horizontal axis, a gear on said vertical ring, a slidably mounted gear adapted to be brought into mesh with said first mentioned gear to reset the gyroscope, means for sliding said gears into and out of mesh and rotating the same, a caging device for locking the gyroscope about its horizontal axis, and means for operating said device from said gear sliding means.

11. In a gyroscopic indicator, a fixed casing, a gyroscope mounted therein with three degrees of freedom including turning about two axes perpendicular to one another and spinning about a third axis perpendicular to both said other axes, a knob for controlling the locking and setting of the gyroscope, a cage adapted to centralize and lock the gyroscope about one of said axes, actuating means for operating said cage upon axial movement of said knob, and means for turning said gyroscope about said other axis of turn while caged upon rotation of said knob after being so axially moved.

12. In a gyroscopic indicator, a fixed housing, a ring mounted thereon for rotation about an axis, a gyro casing journaled therein for oscillation about an axis perpendicular to said first named axis, a gyro rotor journaled therein on an axis normally perpendicular to both said other axes, a locking lever pivoted on said ring for locking said casing about its axis of oscillation, manual means operable from the front of said housing for engaging and turning said ring about the first mentioned axis, and means also operable by said manual means for moving said lever to locking position.

13. In a directional gyroscope, a fixed housing, a ring rotatably mounted in said housing about a vertical axis, a rotor bearing casing pivotally mounted in said ring for oscillation about a horizontal axis, a locking member movably mounted on said vertical ring and adapted to engage said casing to lock the same about said horizontal axis, a sleeve slidably mounted for movement along said vertical axis in said housing for engaging the member to raise and lower the same, and manual means operable from the front of said housing for reciprocating said sleeve.

14. In a directional gyroscope, a fixed housing, a ring rotatably mounted in said housing about a vertical axis, a rotor bearing casing pivotally mounted in said ring for oscillation about a horizontal axis, a locking member movably mounted on said vertical ring and adapted to engage said casing to lock the same about said horizontal axis, a sleeve slidably mounted for movement along said vertical axis in said housing for engaging the member to raise and lower the same, manual means operable from the front of said housing for reciprocating said sleeve, and complementary gearing on said ring and manual means respectively and adapted to be brought into engagement upon operation of said manual means for turning said ring and member about said vertical axis while said casing is locked about its horizontal axis.

ELMER A. SPERRY, Jr.